United States Patent Office 3,835,036
Patented Sept. 10, 1974

3,835,036
DRYCLEANING COMPOSITIONS
Herman Roy Jackson, 1981 San Marco Blvd.,
Jacksonville, Fla. 32207
No Drawing. Original application July 30, 1971, Ser. No. 167,863, now Patent No. 3,766,075. Divided and this application July 20, 1973, Ser. No. 381,199
Int. Cl. C10g 29/00, 33/04
U.S. Cl. 208—249
3 Claims

ABSTRACT OF THE DISCLOSURE

Residual moisture and sulfur and other residual reducing agent impurities contained in drycleaning solvents are removed by adding to the solvents an unsubstituted aromatic hydrocarbon or a halogen or alkyl substituted aromatic hydrocarbon and dried cellulosic material on which has been precipitated a fine deposit of lead dichromate. The same materials may also be added to petroleum products in order to remove sulfur impurities therefrom.

This is a division of application Ser. No. 167,863, filed July 30, 1971, now U.S. Pat. 3,766,075.

BACKGROUND OF THE INVENTION

Field of the Invention

The present invention concerns improving the cleaning properties of organic solvents used in drycleaning operations, and specifically, concerns improving the cleaning properties of such organic drycleaning solvents by removing residual moisture therefrom as well as sulfur and other residual reducing agents by the oxidation of the same.

Description of the Prior Art

In commercial dry cleaning operations, various types of organic solvents have been employed in the past in the drycleaning process to remove soils from fabrics and clothing. For example, the prior art has employed solvents such as halogen-substituted aliphatic hydrocarbons such as perchloroethylene (tetrachloroethylene), mineral spirits, various types of petroleum solvents, mixtures of hydrocarbon and halogen-substituted hydrocarbon solvents with detergents, and the like. Typically, the petroleum solvents employed in drycleaning operations have a boiling point in the range of from about 200 to about 400° F. and a surface tension of from about 20 to about 30 dynes/cm. at room temperature (i.e., 20° C.). A typical prior art formulation of a halogenated hydrocarbon solvent-detergent combination is manufactured by Du Pont and sold under the trade name Valclene, which is a combination of a fluorocarbon solvent and a special high-performance detergent with a boiling point of about 118° F., a density of about 13.16 pounds per gallon at 68° F. and a surface tension at 68° F. of about 20 dynes/cm. A suitable fluorocarbon solvent is trichlorotrifluoroethane as the solvent constituent for Valclene.

Other solvents such as carbon tetrachloride and methylisobutylketone have also been employed in the past in commercial drycleaning operations. Due to the good stability and relatively high cost of these solvents, they are naturally reused and continuously recycled in the drycleaning process, and thus it becomes desirable to recondition the solvents by removing residual moisture, sulfur, and other residual reducing agents therefrom in order to provide reconditioned solvent for cleaning successive batches of soiled fabrics and clothing.

The prior art, in an effort to remove such impurities from drycleaning solvents, suggests that the formulations used as the solvents be distilled after the drycleaning operation; however, distillation is normally expensive and sometimes difficult to conduct without costly equipment, and problems arise in some instances because of the loose additives present in the drycleaning mixtures.

Another suggested solution for the removal of the impurities from the solvents is by a filtration and absorption technique wherein the impurities are selectively removed from the solvents after the same have been used to clean soiled fabrics. However, the use of such techniques is disadvantageous in that equipment cost becomes high, and other mechanical problems with respect to the apparatus prevent this method from being efficiently conducted. In addition, the loose additives which may be present in the drycleaning formulation may tend to inhibit effective filtration and absorption.

The prior art also suggests the addition of water to common formulations of drycleaning mixtures in order to improve the drycleaning characteristics of the solvents employed for the cleaning operations. Normally, water would be added to drycleaning solvents to enable the solvents to dissolve water soluble components of stains on fabrics or clothing. However, most modern fabrics are nonwettable and the presence of water, even in small amounts, prevents the organic solvents, which are generally non-polar in nature, from dissolving slightly polar stains such as fats, etc., in the solvents since the stains become hydrated through dipole-dipole bonding with the water molecules.

During the drycleaning operation, the relative humidity of the solvent changes according to the humidity of the ambient air and that present in the fabric or clothing being cleaned. Normally, the relative humidity of the solvents is maintained at about 65 to 70% in order to dissolve, for example, salts and sugars from stains. However, the control of the amount of moisture which is present in organic drycleaning solvents is very important, since serious problems are encountered if the amount of moisture in the solvents becomes either too high or too low.

Too much moisture in drycleaning solvents may result in fiber shrinkage or distortion, the dulling of colors of the fabrics or clothing being cleaned and possible fading of the fabrics. In addition, fabrics become harder to press following cleaning. Too low a moisture level in the solvent results in the redepositing of water-soluble substances on the fabrics or clothing being cleaning, with the result that stains cannot be effectively removed. Further, a low moisture content in the drycleaning solvent may result in carbon being redeposited on the fabric, thereby adversely affecting the color of the fabric and leaving the fabric with static electricity charges which make it uncomfortable for a person to subsequently wear the clothing; in addition, the presence of static electricity charges present a danger of explosion with certain types of solvents.

In addition to the problems inherent in the use of drycleaning solvents containing too much or too little moisture, other problems are apparent due to the presence of impurities such as sulfur and other reducing agents in drycleaning solvents. Such impurities may deposit on the fibers of the clothing being cleaned, resulting in discoloration and spotting thereof, or their presence in the solvents may result in fading of the colors of the fabrics being cleaned, may cause odors to remain on the cleaned products, and in addition, especially with respect to sulfur impurities, may cause corrosion of the equipment being use to clean the material.

Accordingly, it would be desirable to very strictly control the moisture content of drycleaning solvents in order to prevent, primarily, shrinkage of clothing being cleaned, and also to prevent adverse static electricity effects. Further, it would be desirable to remove impurities such as sulfur from drycleaning solvents in order to make the drycleaning process more effective and to prevent adverse effects such as color fading and corrosion of the equipment employed in the drycleaning operation.

Accordingly, it is a principal object of the present invention to provide a means of removing residual moisture from typical formulations of drycleaning solvents.

It is a further object of the present invention to provide improved drycleaning compositions free of residual moisture and impurities, without the adverse effects shown in the prior art.

It is a further object of the present invention to provide a method of removing impurities contained in the solvents as a result of the drycleaning operation.

It is a further object of the present invention to provide a method of drycleaning using such improved drycleaning solvents.

Other objects and advantages of the present invention will become apparent from the ensuing description.

SUMMARY OF THE INVENTION

The present invention provides an improved drycleaning composition which comprises an organic drycleaning solvent to which has been added an unsubstituted or halogen or alkyl substituted aromatic hydrocarbon and dried cellulosic material onto which has been precipitated a fine deposit of an oxidizing agent, preferably lead dichromate, $PbCr_2O_7$. The cellulosic material thus treated will not only absorb any excess moisture present in the solvent mixture but will also clean the solvent by removing impurities therefrom through oxidation by means of the dichromate. The removal of the residual moisture and the impurities greatly enhances the drycleaning characteristics of the solvents. The addition of the same materials to petroleum products also removes sulfur impurities therefrom.

DESCRIPTION OF THE PREFERRED EMBODIMENTS

Generally, the present invention is applicable to any type of organic drycleaning solvent normally employed in drycleaning operations. Many types of solvents are well known in the art, as indicated by the above discussion, and those of ordinary skill in the art will realize that the efficacy of the present invention is not limited to a certain class of organic drycleaning solvents. Preferably, the solvents which are employed in the present invention are aliphatic halogen-substituted hydrocarbons or more preferably petroleum solvents having a boiling point in the range of from about 200 to about 400° F. and a surface tension of from about 20 to about 30 dynes/cm. at 20° C. Typical examples of such halogen-substituted aliphatic hydrocarbons are trichlorotrifluoroethane, carbon tetrachloride, perchloroethylene, and the like. Typical suitable petroleum solvents are mineral spirits, petroleum ethers, methyl-isobutyl ketone and the like. It is to be specifically understood, however, that the present invention is especially applicable to any petroleum solvent having the above properties.

The present invention contemplates adding to such organic drycleaning solvents an unsubstituted aromatic hydrocarbon or a halogen or alkyl substituted aromatic hydrocarbon having a boiling point between about 78 and about 250° C. Typical examples of suitable unsubstituted aromatic hydrocarbons are benzene and naphthalene. Suitable alkyl-substituted aromatic hydrocarbons are lower alkyl, preferably methyl- or ethyl-, substituted aromatic hydrocarbons, such as xylene, toluene, and the like. Further, suitable halogen-substituted aromatic hydrocarbons are chlorobenzene and the like. However, the present invention is expressly applicable to those compounds satisfying the above property, although not specifically enumerated in the present specification. Those of ordinary skill in the art, with a minimum degree of experimentation, are certainly able to practice the present invention using aromatic compounds having the necessary boiling point but not specifically identified herein, according to the end use desired.

Generally, the amount of the above-identified aromatic compound which is incorporated into the organic drycleaning solvent composition varies from 3 liquid ounces to 1 gallon of aromatic compound per 100 gallons of organic solvent. The particular amount of a specific aromatic hydrocarbon may vary within this range depending upon the aromatic hydrocarbon selected; however, an amount of aromatic hydrocarbon within this range is generally suitable for the purposes of the present invention.

As indicated above, the present invention also contemplates the addition of a quantity of dried cellulosic material to the organic drycleaning solvent, upon which has been precipitated a fine deposit of an oxidizing agent, preferably lead dichromate, $PbCr_2O_7$. Generally, from about 1 to about 25 pounds of the dried cellulosic material is added to the drycleaning solvent per 100 gallons of the organic solvent. Typical cellulosic materials include, for example, various types of cotton, such as cotton rags, cotton cloth or plain cotton, or any other material containing cellulosic fibers.

The amount of cellulosic material which is added to the organic drycleaning solvent may vary within the above-stated range depending upon the amount of lead dichromate deposited on the surface of the cellulosic material and the impurity or moisture content of the drycleaning solvents. However, an amount of cellulosic material within the above-stated range is generally suitable for the purposes of the present invention.

It has been determined that adding the aromatic hydrocarbon and the cellulosic material, within the ranges above stated, to an organic drycleaning solvent, effectively eliminates residual moisture from the drycleaning solvent, without being accompanied by the defects of the prior art. More specifically, the prior art indicates that at extremely low humidities, carbon becomes redeposited on the clothes being cleaned, resulting in adverse static electricity effects. However, the drycleaning compositions of the present invention remove up to about 98% of the carbon present, with no redepositing on the clothing being observed. Further, the adverse static electricity effects noticed when prior art compositions are employed at low humidities are substantially eliminated by the present invention, and therefore, the wearer of the clothing after cleaning does not experience uncomfortable effects therefrom, and in addition, the reduction of static electricity charges in the clothing reduces any explosion hazard which may exist depending upon the particular solvent employed.

The use of the compositions of the present invention in normal commercial drycleaning operations results in extremely uniform cleaning, without the adverse effects of shrinkage, color fading, dullness of colors, etc. In addition, stains comprsed of carbon, salt, sugar, fats, etc., in the clothes being cleaned are substantially completely removed from the clothes without any adverse effects. Thus, the present invention provides an improved drycleaning composition which enables those skilled in the art to achieve extremely uniform drycleaning operations without the adverse effects of the prior art.

It is believed that the lead dichromate precipitate on the cellulosic material removes impurities such as sulfur compounds from the clothes being drycleaned by oxidizing the same to sulfite or sulfate, which then can be removed either as a precipitate or by dissolving the same in the water absorbed on the cellulosic material.

The lead dichromate precipitated onto the cellulosic material may be produced as follows. Lead chromate, $PbCrO_4$, is added to concentrated sulfuric acid in a ratio of from about 2 to about 30 grams of lead chromate per 1 liquid ounce of concentrated sulfuric acid, and preferably about 10 grams of lead chromate per liquid ounce of concentrated sulfuric acid. The product, a mixture of lead sulfate, lead dichromate and dichromic acid, is then diluted with a suitable quantity of water, preferably from about 1 to about 5 gallons. The cellulosic material is then immersed into the resulting suspension for a period of time of from about 5 to about 10 minutes, with agitation, and finally, quickly dried. This procedure may be varied as necessary, depending upon the particular amounts of ingredients utilized. However, the procedure indicated as well as the amounts indicated are sufficient for producing a fine precipitated lead dichromate deposit on the cellulosic material which enables the cellulosic material to be efficaciously employed in the present invention. The cellulosic material can then merely be added to the organic dry cleaning solvent employed in the amounts indicated above. Preferably, it should be added to the organic drycleaning solvent in a dry condition, and after each drycleaning operation, hte material may be removed from the system and dried again. In this manner, the cellulosic material can be used over again many times without having to subject the same to further treatment with the lead chromate solution. In other words, in the drycleaning compositions of the present invention, the cellulosic material having the lead dichromate deposited thereon, is very durable and provides for a sustained removal of impurities from organic drycleaning solvents without having to be subjected repeatedly to the precipitation operation described above.

With regard to the particular oxidizing agent precipitated on the cellulosic material, it has been determined that lead dichromate is the most preferable for use in the present invention. In fact, no other oxidizing agent is superior to the lead dichromate for removing residual moisture and impurities such as sulfur compounds from organic drycleaning solvents.

As mentioned above, the most preferable organic drycleaning solvents are the petroleum solvents having the boiling points and surface tensions above indicated. In addition, halogen-substituted aliphatic hydrocarbons such as trichlorotrifluoroethane and perchloroethylene can be employed. Generally, the present invention is applicable to any known organic drycleaning solvent, with those of ordinary skill in the art being able to select appropriate solvents depending upon the conditions of operation, the particular type of clothing or fabric being cleaned, the temperatures of operation, the types of stains to be removed, etc.

It has further been found that the addition of from about 1 to about 5% by weight, based on the weight of the organic drycleaning solvent, of a pine oil containing terpineol or other monocyclic terpene alcohols increases the ease of removal of carbon, salt and sugar deposits from clothes in the drycleaning process. Generally, pine oil is a crude turpentine resulting from the distillation of pinewood and contains chiefly γ-terpinene, cineol, frenchyl alcohol, borneol and α-terpineol. Typical pine oils which may be employed are mixtures wherein at least 5 wt. percent thereof has a boiling point over 200° C. and wherein at least 95% by weight thereof has a boiling point of over 220° C. Preferably, the pine oils have a number molecular weight of from about 150 to about 230, and most preferably, the viscosity of the pine oil at 25° C. is about 16 centipoises.

It has been further discovered that sulfur impurities may be removed from petroleum products such as crude oil, gasoline, jet fuel, diesel oil, and like petroleum products, by adding thereto cellulosic material which has been treated as above indicated, in conjunction with a small amount of a mixture of naphthalene and xylene. Generally, from about 1 to about 25 pounds of the cellulosic material may be added to each 100 gallons of the petroleum liquids, depending upon the amount of impurities present, and the conditions under which the impurities are to be removed. The naphthalene-xylene mixture is added to the petroleum products in an amount of from about 1 liquid ounce to about 1 pint per 100 gallons of the petroleum liquid, depending upon the amount of impurities present. Further, the particular naphthalene-xylene mixture employed may have a composition between about 10 and about 90 volume percent naphthalene and from about 90 to about 10% xylene by volume. For example, a typical formulation is as follows:

21 ounces of naphthalene, 1 gallon of xylene, 30 pounds of dried cotton rags treated with 10 grams of lead chromate per 300 gallons of gasoline. This same formulation would be operable for jet fuel, kerosene and diesel oil.

Further, it has been found that a small amount of water should be present in the petroleum products containing the cellulosic material and the naphthalene-xylene mixture. Generally, from about 1 pint to about 1 gallon of water should be present per 100 gallons of the petroleum products. If this amount of moisture is not present in the petroleum products, it should be added thereto to provide for suitable removal of the sulfur impurities. The temperature at which the petroleum liquid should be maintained during removal of sulfur impurities therefrom by the use of such a composition is about 20° F. below the boiling point of the treated material. Of course, this temperature may vary as desired, with the proviso that the use of a low temperature results in the removal of the impurities taking a longer time. Optimum temperatures for different mixtures of naphthalene and xylene, and different amounts of cellulosic material, can be determined with a minimum degree of experimentation by those of ordinary skill in the art. Generally, by operating within the parameters above indicated, the removal of sulfur compounds from petroleum products, such as gasoline, is very effective by the use of such a composition.

Although the reason why these materials will remove sulfur impurities from petroleum products is not specifically known, it is believed that the xylene and naphthalene undergo an endothermic reaction which causes the atoms in the naphthalene molecule to come closer together, thus giving off a small amount of electric current which is attracted by the cellulosic material (which has the capability of transmitting an electric current). The chromate molecules contained on the cellulosic material probably oxidize the sulfur compounds which are contained in the petroleum products to sulfate, sulfite, etc., which can be removed by any suitable means. It is important to remove sulfur from petroleum products such as gasoline, since sulfur compounds present therein adversely effect any lead additive which may be present in the gasoline. The addition of the above materials to petroleum products, such as gasoline, would diminish or substantially eliminate this effect and increase the efficiency of the lead additive contained in the gasoline (i.e., increase the mileage to be derived per unit volume of gasoline).

Obviously, as a result of the generation of the electric current, the vessel in which the liquid is contained should be grounded.

The above description should not be taken as limiting the present invention to the actual embodiments specifically disclosed, but should be deemed to describe equivalents thereof which may be employed in the practice of the present invention. Those of ordinary skill in the art may make suitable modifications of the present invention according to the above description, without departing from the scope thereof.

What is claimed is:

1. A method of removing sulfur impurities from petroleum products comprising adding to said petroleum products a composition consisting essentially of a mixture of naphthalene and xylene and cellulosic material selected from the group consisting of cotton rags, cotton cloth or plain cotton or other material containing cellulosic fibers having precipitated thereon lead dichromate.

2. The method of claim 1 wherein from about 1 to about 25 pounds of said cellulosic material per 100 gallons of said petroleum products is added, and wherein from about 1 liquid ounce to about 1 pint of said naphthalene-xylene mixture per 100 gallons of said petroleum products is added.

3. The method of claim 1 wherein from about 1 pint to about 1 gallon of water is present in said petroleum products.

References Cited

UNITED STATES PATENTS

| | | | |
|---|---|---|---|
| 2,205,331 | 6/1940 | Alton | 208—306 |
| 3,215,619 | 11/1965 | Brooke | 208—188 |
| 3,417,013 | 12/1968 | Roberts | 208—188 |
| 3,278,657 | 10/1966 | Clements et al. | 208—179 |
| 3,766,075 | 10/1973 | Jackson | 252—104 |

DELBERT E. GANTZ, Primary Examiner

J. M. NELSON, Assistant Examiner

U.S. Cl. X.R.

208—188, 306